United States Patent
Zaretzky et al.

(10) Patent No.: US 9,392,328 B2
(45) Date of Patent: *Jul. 12, 2016

(54) DEVICE-AGNOSTIC CONTENT MANAGEMENT, PLAYBACK AND STATUS MONITORING SYSTEM

(71) Applicants: Jeremy Zaretzky, Seattle, WA (US); William F. Gerba, Delray Beach, FL (US)

(72) Inventors: Jeremy Zaretzky, Seattle, WA (US); William F. Gerba, Delray Beach, FL (US)

(73) Assignee: WireSpring Technologies, Inc., Fort Lauderdale, FL (US)

( * ) Notice: Subject to any disclaimer, the term of this patent is extended or adjusted under 35 U.S.C. 154(b) by 294 days.

This patent is subject to a terminal disclaimer.

(21) Appl. No.: 14/271,483

(22) Filed: May 7, 2014

(65) Prior Publication Data

US 2014/0259036 A1 Sep. 11, 2014

Related U.S. Application Data

(63) Continuation of application No. 13/568,213, filed on Aug. 7, 2012, now Pat. No. 8,756,316, which is a continuation of application No. 13/457,615, filed on Apr. 27, 2012, now Pat. No. 8,260,842.

(51) Int. Cl.

| | |
|---|---|
| *G06F 15/16* | (2006.01) |
| *H04N 21/442* | (2011.01) |
| *H04L 29/08* | (2006.01) |
| *H04N 21/4425* | (2011.01) |
| *H04N 21/234* | (2011.01) |
| *H04N 21/24* | (2011.01) |
| *H04N 21/439* | (2011.01) |
| *H04N 21/466* | (2011.01) |
| *H04N 21/61* | (2011.01) |
| *H04N 21/6587* | (2011.01) |
| *G06F 12/00* | (2006.01) |

(52) U.S. Cl.
CPC .... *H04N 21/44213* (2013.01); *H04L 29/08072* (2013.01); *H04N 21/23418* (2013.01); *H04N 21/2407* (2013.01); *H04N 21/4394* (2013.01); *H04N 21/4424* (2013.01); *H04N 21/4425* (2013.01); *H04N 21/44204* (2013.01); *H04N 21/44222* (2013.01); *H04N 21/4667* (2013.01); *H04N 21/6131* (2013.01); *H04N 21/6181* (2013.01); *H04N 21/6587* (2013.01)

(58) Field of Classification Search
USPC .......................... 709/202–203, 223–229, 250
See application file for complete search history.

(56) References Cited

U.S. PATENT DOCUMENTS

| | | | | |
|---|---|---|---|---|
| 8,260,842 B1 * | 9/2012 | Zaretzky | ............ | H04N 21/4424 709/202 |
| 8,756,316 B2 * | 6/2014 | Zaretzky | ............ | H04N 21/4424 709/224 |

* cited by examiner

*Primary Examiner* — Zarni Maung
(74) *Attorney, Agent, or Firm* — Shawn T. Gordon

(57) ABSTRACT

A system is provided that includes a software agent, an electronic device, a display, and a content management system. The electronic device accesses the software agent and interprets it with a software application, such as a web browser. Embedded within the software agent is a playback system, which dictates content to be shown, and a monitoring system, which collects logging and status data. At least some of the content is stored on the electronic device prior to display, and at least some of the logging and status data is stored on the electronic device prior to being transferred to the content management system.

20 Claims, 3 Drawing Sheets

DEVICE-AGNOSTIC CONTENT MANAGEMENT, PLAYBACK AND STATUS MONITORING SYSTEM

CROSS-REFERENCE TO RELATED APPLICATIONS

This application is a continuation of and claims the benefit of U.S. patent application Ser. No. 13/568,213 titled "Device-Agnostic Content Management, Playback and Status Monitoring System" and filed Aug. 7, 2012, which is a continuation of and claims the benefit of U.S. patent application Ser. No. 13/457,615 titled "Device-Agnostic Content Management, Playback and Status Monitoring System" and filed Apr. 27, 2012, now U.S. Pat. No. 8,260,842.

STATEMENT REGARDING FEDERALLY SPONSORED RESEARCH OR DEVELOPMENT

Not applicable.

FIELD OF THE INVENTION

This invention relates to the distribution, management, and playback of multimedia content.

BACKGROUND OF THE INVENTION

Within a given organization, it is common to see several different systems used for managing content and monitoring the health status of different types of remote devices. As the number and type of remote devices grows, the cost of maintaining and integrating content management and device management systems using standard systems eventually becomes prohibitive. In addition, when many different types of playback devices are configured to show the content—for example, PCs, mobile phones, tablets, and dynamic signs—these devices will typically have different physical form factors and playback capabilities, so the desired content may need to be transmitted via different channels or in different formats to ensure correct playback. Regardless of the level of integration achieved, these systems also require that repetitive tasks be performed manually in order to manage the content schedules on different device types.

When prior art content management systems attempt to provide a universal playback environment to replace these disparate systems, they typically utilize a remedial web-based rendering environment to play back content that is streamed over the Internet. While some prior art discusses storing content prior to display, the prior art does not provide a method in which the playback system may dictate the content to be displayed in conjunction with such storage. Further, these systems lack the ability to store logging and status data on the device after it is collected. As a result, existing solutions are highly sensitive to interruptions in the device's network connection.

Accordingly, there is a need for a system that can dictate the storage and playback of content obtained over a communication network (such as the Internet) on a diverse set of electronic devices, and reliably collect logging and status data from each device.

SUMMARY OF THE INVENTION

It is an object of the invention to provide a system for content playback and management. In an embodiment of the invention, a software agent is accessed by an electronic device that is in communication with a display and that contains a software application which interprets the software agent, a content management system is in communication with the software agent, a playback system embedded within the software agent dictates content to be shown by the electronic device, wherein at least some of the content and instructions pertaining to the content are sent from the content management system and stored on the electronic device prior to display, and a monitoring system embedded within the software agent collects logging data pertaining to the activity of the playback system and status data pertaining to other activity of the electronic device, wherein at least some of the data is stored on the electronic device prior to transfer of the data to the content management system.

It is a further object of the invention that the system operate via a computer network, such as the Internet.

It is a further object of the invention that the devices are any of the following: desktop and laptop PCs, mobile phones, IP phones, tablets, set-top boxes, TVs, embedded systems, dynamic signs, and other devices containing a web browser or similar software application.

It is a further object of the invention that the content is any of the following: video, animation, still image, uniform resource locator (URL), scrolling text, and templated content.

It is a further object of the invention that live or streaming video content may be obtained from a source selected from the group consisting of antenna, cable, and satellite.

It is a further object of the invention that the content is controlled by a playlist, which itself may contain other playlists.

It is a further object of the invention that the device shows more than one zone of content at once.

It is a further object of the invention that the device allows the user to interact with the content.

It is a further object of the invention that each playback and interaction is logged.

It is a further object of the invention that the system can retrieve periodic snapshots or a live video stream of what is being shown on the device.

It is a further object of the invention that the device enable users to submit feedback on the displayed content and the feedback is used to adjust subsequent displayed content on the device.

It is a further object of the invention that the device allows the user to pause the content and resume viewing later, on the same device or a different one.

It is a further object of the invention that the system can change settings associated with the device.

It is a further object of the invention that the content management system provides shortcuts to viewing a particular set of files via a known technology, such as a URL shortener or QR code generator.

It is a further object of the invention that a password may be required for content to be shown.

It is a further object of the invention that a gaming or incentives feature is included in which user identities are associated with content views.

It is a further object of the invention that additional technologies such as payments, NFC, or third-party ad insertion are provided for.

It is a further object of the invention that employee training videos, safety messaging, and HR updates can be selectively delivered to devices associated with selected employees.

It is a further object of the invention that recruiting videos and wayfinding maps can be sent to the devices of selected visitors on a corporate or educational campus.

It is a further object of the invention that featured product videos or links to e-commerce pages, coupons, surveys, and social media sites can be selectively sent to devices associated with retail or restaurant customers.

DETAILED DESCRIPTION OF PREFERRED EMBODIMENTS

The invention provides a universal mechanism for distributing content to virtually any type of electronic device, automating repetitive scheduling tasks, and monitoring all of these disparate devices from a centralized interface. The system is designed to run largely (or entirely) inside of a web browser. As such, it is compatible with any device capable of running a browser, regardless of what operating system (e.g., Windows, Mac OS, Android), what screen size/resolution, and even what underlying hardware (e.g., x86/ARM CPU) is present, and is suitable for running on most computing devices containing a CPU and a screen (for example, PCs, mobile phones and tablets). The web browser interprets the code and data objects of the system, and provides a layer of abstraction where various pieces of information about the underlying hardware and operating system can be gleaned, although this information does not necessarily have to be utilized in order to display content.

The system of the invention can fetch content from remote locations, store it locally (as needed), create local databases for logging information, and create two-way synchronous and non-synchronous connections to external servers from which to access data and instructions. Many types of content, including text, templated structured data (such as HTML or XML), video and images are also supported by the system, as are numerous visual effects and controls useful in organizing the content. By handling all tasks from device registration to content acquisition to screen layout to content playback and logging and status monitoring inside the browser (or a similar application capable of interpreting a combination of structured data, source code and data objects in near real-time), it is possible for a centralized content playback and management platform to deliver a uniform content experience to a variety of different display devices while collecting logging and status data from these devices.

Figure 1:
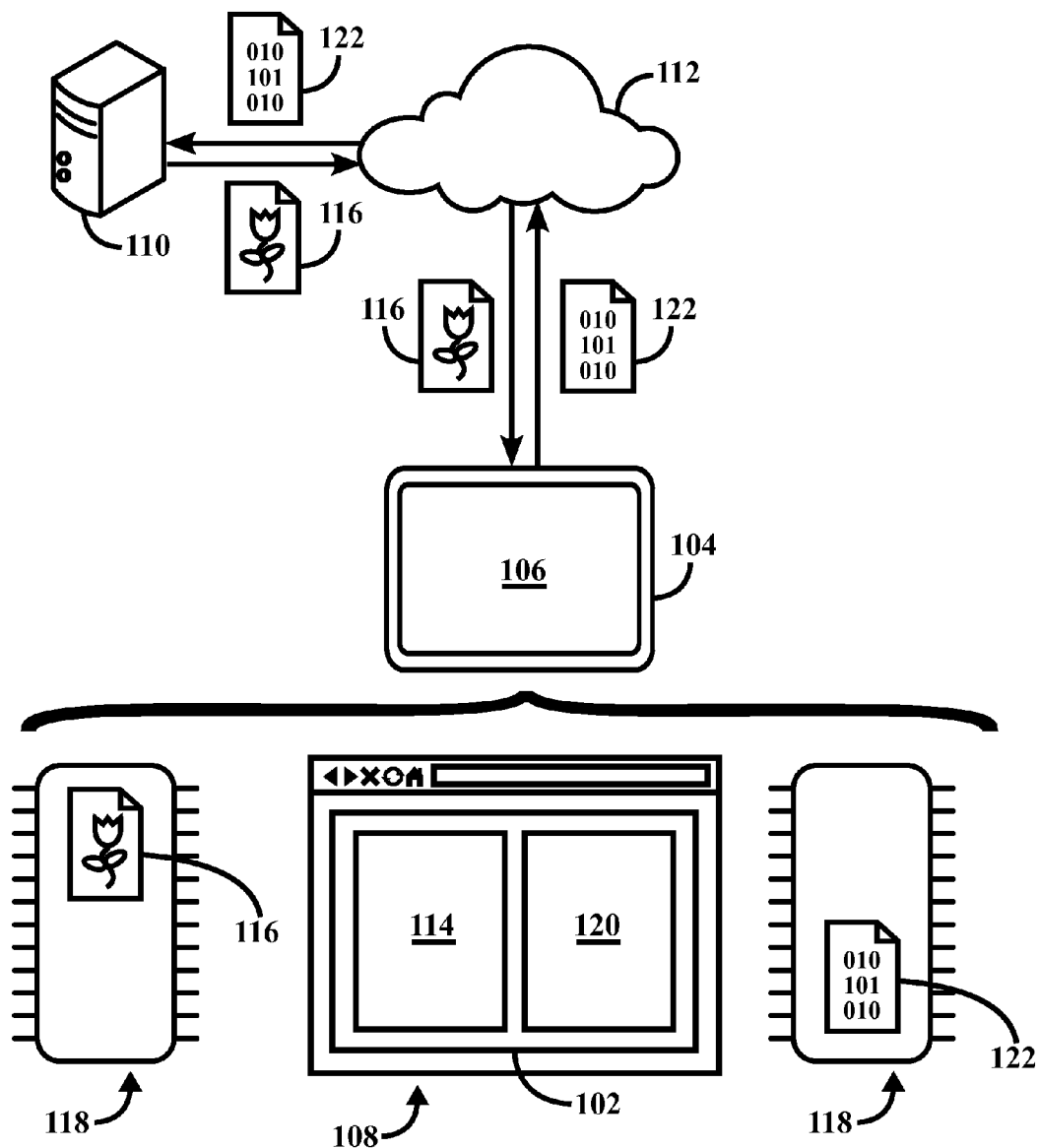
FIG. 1 is a diagram illustrating a system for content playback and management according to one embodiment of the invention.

Referring to FIG. 1, a content management system (CMS) 110 is in communication with an electronic device 104 via a communication link 112 such as the Internet. The electronic device 104 includes or is in communication with a display 106. The electronic device 104 includes a software application 108, which interprets a software agent 102. The software agent 102 is accessed by electronic device 104 and includes a playback system 114 and a monitoring system 120. The CMS 110 sends instructions and content 116 to the electronic device 104 via the playback system 114. The playback system 114 stores the instructions and content 116 prior to display on device storage 118. The playback system 114 determines the content 116 to be shown on the display 106 based on the instructions sent by the CMS 110. The monitoring system 120 collects logging and status data 122, which can be stored on device storage 118 before being transmitted to the CMS 110.

Figure 2:
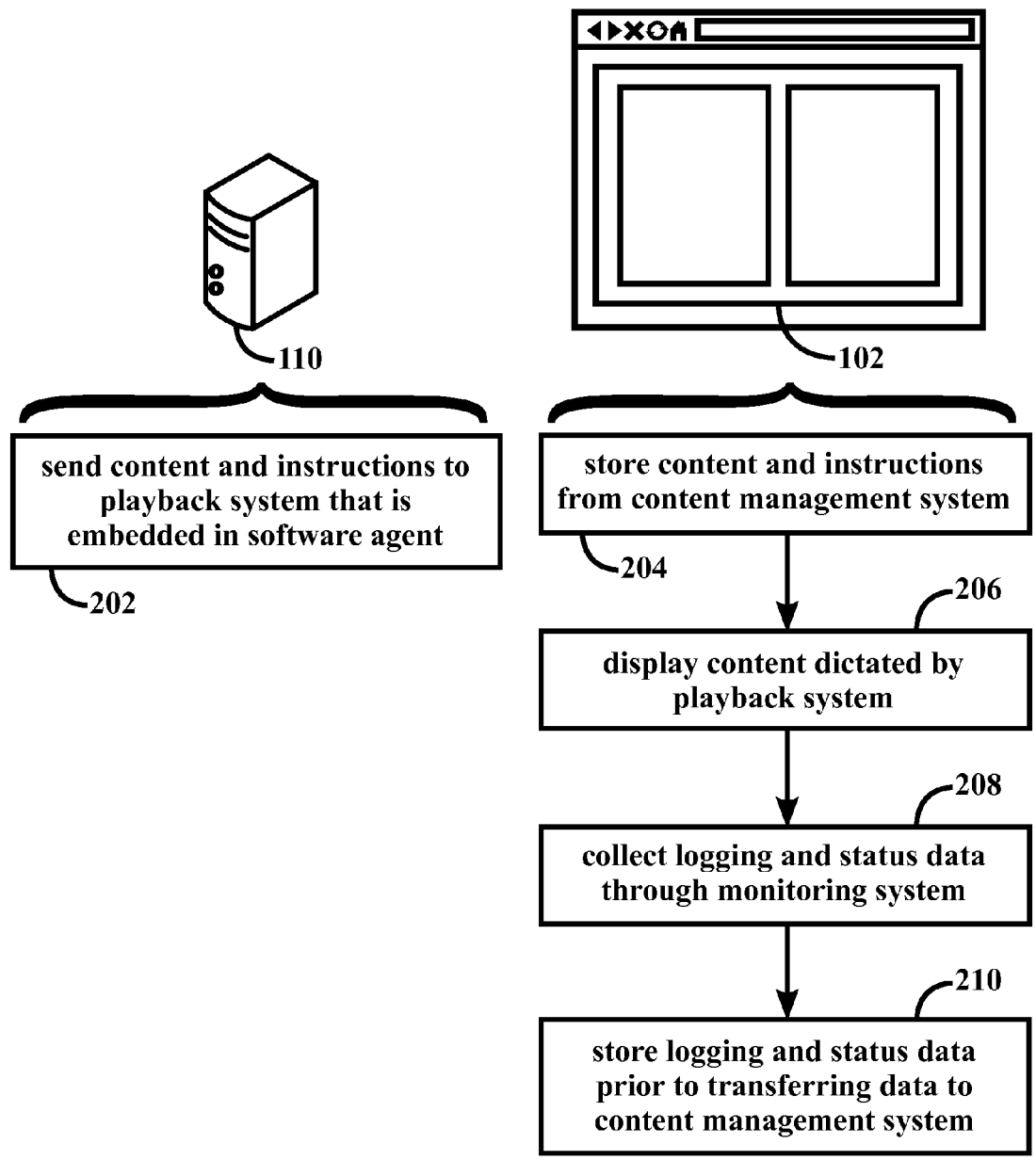
FIG. 2 is a flowchart illustrating a method for content playback and management according to one embodiment of the invention.

In operation, referring to FIG. 2, the CMS 110 sends content and instructions in step 202 over a communication link to the software agent 102. The software agent 102 on the electronic device stores in step 204 the content and instructions sent by the CMS 110 in step 202 on the electronic device. The software agent 102, based on the instructions received from the CMS 110, dictates the content to be displayed on the electronic device in step 206. In step 208, the software agent 102 collects logging data pertaining to the playback system, such as content played, along with status data pertaining to other activity of the electronic device, such as its network connection or wireless signal strength. Software agent 102 stores in step 210 the logging and status data collected in step 208 prior to transferring the logging and status data to the CMS 110.

The functionality of the invention can be divided into four primary areas: (1) device authorization, (2) content provisioning, (3) preparation of software agent, and (4) operation of playback and monitoring systems.

1. Device Authorization

The CMS is configured to allow connections from the display devices, in one of several ways. Most limitingly, the CMS can specify an explicit list of devices allowed to connect and retrieve content, and use some method of authentication to enforce that behavior. Least limitingly, the CMS can specify that any compatible device may connect to it and retrieve content from it (in which case some means of unique device identification may still be required, but only to enhance the CMS's ability to log requests and receive status data from each device, not for the purposes of restricting access). Finally, the CMS might employ a combination of the two approaches described above, where an explicit whitelist (of zero or more items) is combined with logic rules that are applied to data provided by the devices (such as an IP address, connected display size/resolution, globally unique identification number or GUID, or pre-programmed physical location) as well as data provided from remote sensors, data stores and other sources of information.

2. Content Provisioning

Once it is clear which devices are and are not allowed to connect to the CMS, the CMS can function in one of two ways (or both at the same time): it can listen for incoming connections from devices or it can push information out to devices, depending on each device's configuration and capabilities. In the scenario where content is pushed to the device, the CMS would open a connection to each device using a known protocol and addressing scheme (such as is used with UDP/IP or POSIX compliant sockets). The CMS could only connect and push content to known devices, e.g. those entered into its "allowed devices" list as described above. In the scenario where display devices autonomously connect to the CMS in an attempt to pull information from the system, the CMS will allow incoming connections on one or more ports of a listening server. Connections may be made via any mutually-supported data protocol that allows for two-way data exchange, such as TCP/IP. The data itself could be conceptualized as a series of packets (as it might be when using HTTP to transmit/receive the data), or as a stream (as it might be when using websockets to transmit/receive the data).

When connecting via a pull-based system, each device may request either a general URL specified by the CMS, or a URL customized to include some unique identifying information. In the former case, the CMS might have to request additional information from the device before being able to make the appropriate response.

3. Preparation of Software Agent

Figure 3:
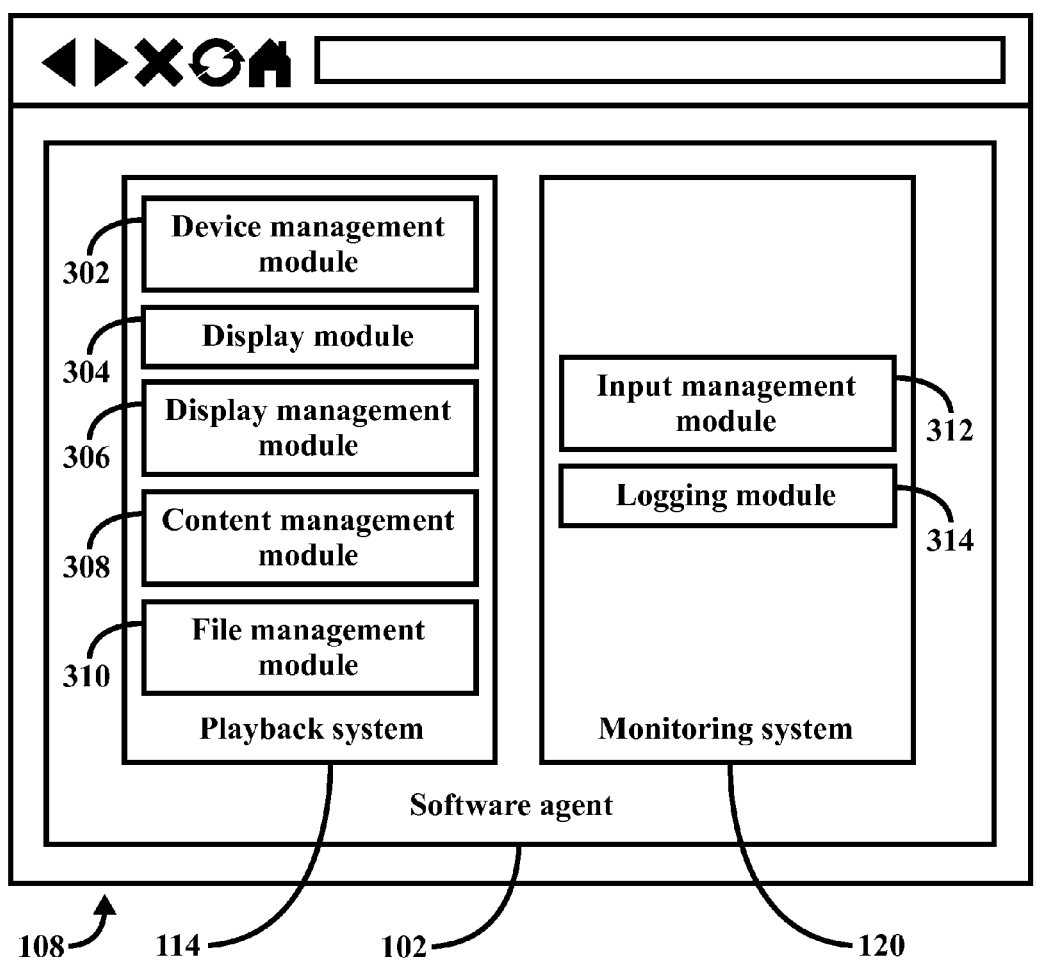
FIG. 3 is a diagram illustrating an aspect of the system for content playback and management illustrated in FIG. 1.

Once connected to the device, the CMS will prepare a software agent utilizing a series of pre-generated software components, which will be arranged based on instructions from the CMS, as well as any relevant information supplied by the device (such as size/resolution of the connected display). Referring to FIG. 3, the components of software agent 102 can be organized under the categories of a playback system 114 and a monitoring system 120, which are described in more detail below.

The playback system 114 allows content to be stored and displayed on the electronic device and can include the following components:

Device management module 302. A device management module 302 maintains communications with the CMS to provide status information and/or connection information, and to retrieve and store content and/or instructions from the CMS.

Display module 304. Display modules 304 handle playback of the content. Different types of display modules may be used to handle playback of different types of content, such as video, still images and text.

Display management module 306. A display management module 306 controls the appearance of the display modules, including how, when and where each appears on the display.

Content management module 308. A content management module 308 takes explicit instructions from the CMS, or uses supplemental logic to dictate what content should be displayed in each of the display modules' display areas.

File management module 310. A file management module 310 identifies all content and data files specified by the CMS, and either builds references (such as hyperlinks) to them, or downloads them to device storage or another temporary or permanent data store for later retrieval and playback by the display modules 304.

The monitoring system 120 allows content playback and other device activities to be tracked, stored, and transmitted to the CMS and can include the following components:

Input management module 312. An input management module 312 controls how input events (such as touches on a touch screen, presses of an attached button, or input from a connected sensor) should be interpreted. These input events might modify the display layout (as specified by the display management module), cause different content to be played, or force the device management module 302 to request or send new information to the CMS.

Logging module 314. A logging module 314 monitors aspects of the other modules and the device itself, including content playback events, and stores the assembled information locally (either in device storage or a another temporary or permanent data store) until such time when the data may be sent back to the CMS.

Once the software components are assembled into the software agent (taking into account any relevant collected inputs from the device and CMS), it is sent to the device as a series of one or more data documents. If the device is connected via a push connection, the CMS sends the software agent directly to the device. If the device is connected via a pull connection, the software agent would be sent as a reply to the device's request. The software agent would then be loaded into an application already contained on the device, which would interpret the software agent and begin running it. In a preferred embodiment, the software agent is primarily composed of web-based technologies such as HTML 5, CSS and JavaScript/ECMAScript, and the software application is a web browser capable of interpreting, processing and displaying these technologies.

4. Operation of Playback and Monitoring Systems

Once rendered, the software agent would automatically begin establishing any necessary connections to the CMS and content/data sources (whether local or remote), downloading content/data files as needed, and playing back content into the display modules based on instructions interpreted by the various management modules. These playbacks and other events (such as input events or status information pertaining to other aspects of the device, such as its network connection or wireless signal strength) would be monitored by functions in the software agent's various modules, and logged. The logs would temporarily be stored locally, and would periodically be sent to the CMS. Because the device and the software agent could have semi-persistent connections to the CMS and any associated sensors, data stores or content sources, it would also be possible to perform specific actions like setting up "hard" content playback schedules to ensure that all displays are showing the same, specified content at the same time. Likewise, it would be possible to coordinate multiple connected devices to act in unison to display larger pieces of content, e.g., in a multi-screen video wall. Finally, it would be possible to force immediate content changes to all connected devices, which would be particularly useful, for example, in delivering emergency notifications to many devices at once.

The invention claimed is:

1. A system for content playback and management comprising:
    a software agent accessed by a mobile phone that contains a web browser which interprets the software agent;
    a content management system in communication with the software agent;
    a playback system embedded within the software agent that dictates content to be shown by the mobile phone, wherein at least some of the content and instructions pertaining to the content are sent from the content management system and stored on the mobile phone prior to display; and
    a monitoring system embedded within the software agent that collects logging data pertaining to the activity of the playback system and status data pertaining to other activity of the mobile phone, wherein at least some of the data is stored on the mobile phone prior to transfer of the data to the content management system.

2. The system of claim 1, wherein the logging and status data includes any of the following: periodic snapshots of the content shown, or a live video stream of the content shown.

3. The system of claim 1, wherein the monitoring system listens for feedback that pertains to the content and that is provided when a user touches a touch screen, presses an attached button, or interacts with a connected sensor, and subsequently relays the feedback to the playback system.

4. The system of claim 1, wherein a user may pause the content and resume viewing the content at a later time.

5. The system of claim 1, wherein the instructions include at least one change to at least one setting associated with the mobile phone.

6. The system of claim 1, wherein the content management system provides a mechanism for creating a shortcut that corresponds to a particular set of content files and the mechanism is any of the following: URL shortener, QR code generator, or NFC beacon code generator.

7. The system of claim 1, wherein the content is any of the following: employee training video, safety video, human resources video, recruiting video, featured product video, map, or emergency notification.

8. A system for content playback and management comprising:
   a software agent accessed by a tablet computer that contains a web browser which interprets the software agent;
   a content management system in communication with the software agent;
   a playback system embedded within the software agent that dictates content to be shown by the tablet computer, wherein at least some of the content and instructions pertaining to the content are sent from the content management system and stored on the tablet computer prior to display; and
   a monitoring system embedded within the software agent that collects logging data pertaining to the activity of the playback system and status data pertaining to other activity of the tablet computer, wherein at least some of the data is stored on the tablet computer prior to transfer of the data to the content management system.

9. The system of claim 8, wherein the logging and status data includes any of the following: periodic snapshots of the content shown, or a live video stream of the content shown.

10. The system of claim 8, wherein the monitoring system listens for feedback that pertains to the content and that is provided when a user touches a touch screen, presses an attached button, or interacts with a connected sensor, and subsequently relays the feedback to the playback system.

11. The system of claim 8, wherein a user may pause the content and resume viewing the content at a later time.

12. The system of claim 8, wherein the instructions include at least one change to at least one setting associated with the tablet computer.

13. The system of claim 8, wherein the content management system provides a mechanism for creating a shortcut that corresponds to a particular set of content files and the mechanism is any of the following: URL shortener, QR code generator, or NFC beacon code generator.

14. The system of claim 8, wherein the content is any of the following: employee training video, safety video, human resources video, recruiting video, featured product video, map, or emergency notification.

15. A system for content playback and management comprising:
   a software agent accessed by a television that contains a web browser which interprets the software agent;
   a content management system in communication with the software agent;
   a playback system embedded within the software agent that dictates content to be shown by the television, wherein at least some of the content and instructions pertaining to the content are sent from the content management system and stored on the television prior to display; and
   a monitoring system embedded within the software agent that collects logging data pertaining to the activity of the playback system and status data pertaining to other activity of the television, wherein at least some of the data is stored on the television prior to transfer of the data to the content management system.

16. The system of claim 15, wherein the logging and status data includes any of the following: periodic snapshots of the content shown, or a live video stream of the content shown.

17. The system of claim 15, wherein a user may pause the content and resume viewing the content at a later time.

18. The system of claim 15, wherein the instructions include at least one change to at least one setting associated with the television.

19. The system of claim 15, wherein the content management system provides a mechanism for creating a shortcut that corresponds to a particular set of content files and the mechanism is any of the following: URL shortener, QR code generator, or NFC beacon code generator.

20. The system of claim 15, wherein the content is any of the following: employee training video, safety video, human resources video, recruiting video, featured product video, map, or emergency notification.

\* \* \* \* \*